US012649368B2

(12) United States Patent
Marukawa

(10) Patent No.: US 12,649,368 B2
(45) Date of Patent: Jun. 9, 2026

(54) VEHICLE

(71) Applicant: TOYOTA JIDOSHA KABUSHIKI KAISHA, Toyota (JP)

(72) Inventor: Naoki Marukawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 426 days.

(21) Appl. No.: 18/485,444

(22) Filed: Oct. 12, 2023

(65) Prior Publication Data

US 2024/0227575 A1     Jul. 11, 2024

(30) Foreign Application Priority Data

Jan. 11, 2023     (JP) ................................. 2023-002542

(51) Int. Cl.
*B60L 15/00*          (2006.01)
*B62D 33/02*          (2006.01)

(52) U.S. Cl.
CPC ............ *B60L 15/007* (2013.01); *B62D 33/02* (2013.01)

(58) Field of Classification Search
CPC ........ B60L 15/007; B60L 53/22; B62D 33/02
See application file for complete search history.

(56) References Cited

U.S. PATENT DOCUMENTS

| | | | | |
|---|---|---|---|---|
| 5,615,922 | A | * | 4/1997 | Blanchard ................. B60R 9/02 |
| | | | | 224/404 |
| 6,596,941 | B2 | * | 7/2003 | Tripoli .................... B60R 11/02 |
| | | | | 307/151 |
| 9,333,868 | B2 | * | 5/2016 | Uchida ............... B60R 16/0239 |
| 9,409,525 | B2 | * | 8/2016 | Gillam ................. B62D 33/023 |
| 10,910,614 | B2 | * | 2/2021 | Ortmann ................ B60L 50/64 |
| 11,987,131 | B2 | * | 5/2024 | Welschoff ....... B60W 30/18127 |
| 12,202,415 | B2 | * | 1/2025 | Harmon ................... B60R 9/06 |
| 12,227,242 | B2 | * | 2/2025 | Woods ................. B62D 63/025 |
| 2002/0189836 | A1 | | 12/2002 | Tripoli |
| 2016/0009232 | A1 | * | 1/2016 | Budny .................... B60R 11/06 |
| | | | | 29/729 |
| 2020/0079224 | A1 | * | 3/2020 | Pien ................. H01M 10/6568 |

FOREIGN PATENT DOCUMENTS

| | | |
|---|---|---|
| JP | H10-264749 A | 10/1998 |
| JP | 2019-213305 A | 12/2019 |
| WO | WO-2023176860 A1 * | 9/2023 ............... B60K 1/00 |

* cited by examiner

*Primary Examiner* — Jason S Morrow
(74) *Attorney, Agent, or Firm* — SoraIP, Inc.

(57) ABSTRACT

A vehicle including a cargo bed includes a power conversion unit adjacent to one side panel on a vehicle front side of one wheel well extending inward in the vehicle width direction from one side panel on an outer side in the vehicle width direction of the cargo bed. By utilizing the space on the front side of one wheel well extending in the vehicle inner direction of the cargo bed and the space on the front side thereof, the shape of the floor surface of the cargo bed can be suppressed from becoming stuck, and the power conversion unit can be provided.

5 Claims, 5 Drawing Sheets

FR ⬌ RR

VEHICLE

CROSS-REFERENCE TO RELATED APPLICATION

This application claims priority to Japanese Patent Application No. 2023-002542 filed on Jan. 11, 2023, incorporated herein by reference in its entirety.

BACKGROUND

1. Technical Field

The technology disclosed in the present specification relates to a vehicle.

2. Description of Related Art

There is a demand for an electrically-powered vehicle that includes a power converter and is driven by an electric motor, in a vehicle such as a pickup truck or the like that has a cargo bed. For example, a vehicle is disclosed in which a power converter is provided in the middle of a forward portion of a cargo bed (Japanese Unexamined Patent Application Publication No. 2019-213305 (JP 2019-213305 A)).

SUMMARY

In a vehicle that has a cargo bed or a luggage compartment, there are cases in which securing space to dispose a power converter is difficult. Reduction in loading capacity of the cargo bed, and ease-of-use thereof being compromised, due to the power converter, are situations regarding which circumvention is requested.

The present specification provides technology for installing a power converter in a vehicle having a cargo bed, in a simple manner, without reducing the loading capacity and ease-of-use of the cargo bed.

The technology disclosed in the present specification relates to a vehicle including a cargo bed. The vehicle includes a power conversion unit provided on a vehicle-forward side of one wheel well that extends inward in a vehicle-width direction from one side panel on an outer side in the vehicle-width direction of the cargo bed, in proximity to the one side panel.

According to this vehicle, the power converter is provided on the vehicle-forward side of one of the wheel wells, in proximity to the side panel from which the one of the wheel wells extends. Utilizing one wheel well extending in a vehicle-inward direction of the cargo bed and space on the forward side thereof enables the power converter to be provided without the shape of the floor surface of the cargo bed becoming irregular. Accordingly, the power converter can be easily installed in the vehicle without significantly reducing the load capacity and ease-of-use of the cargo bed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
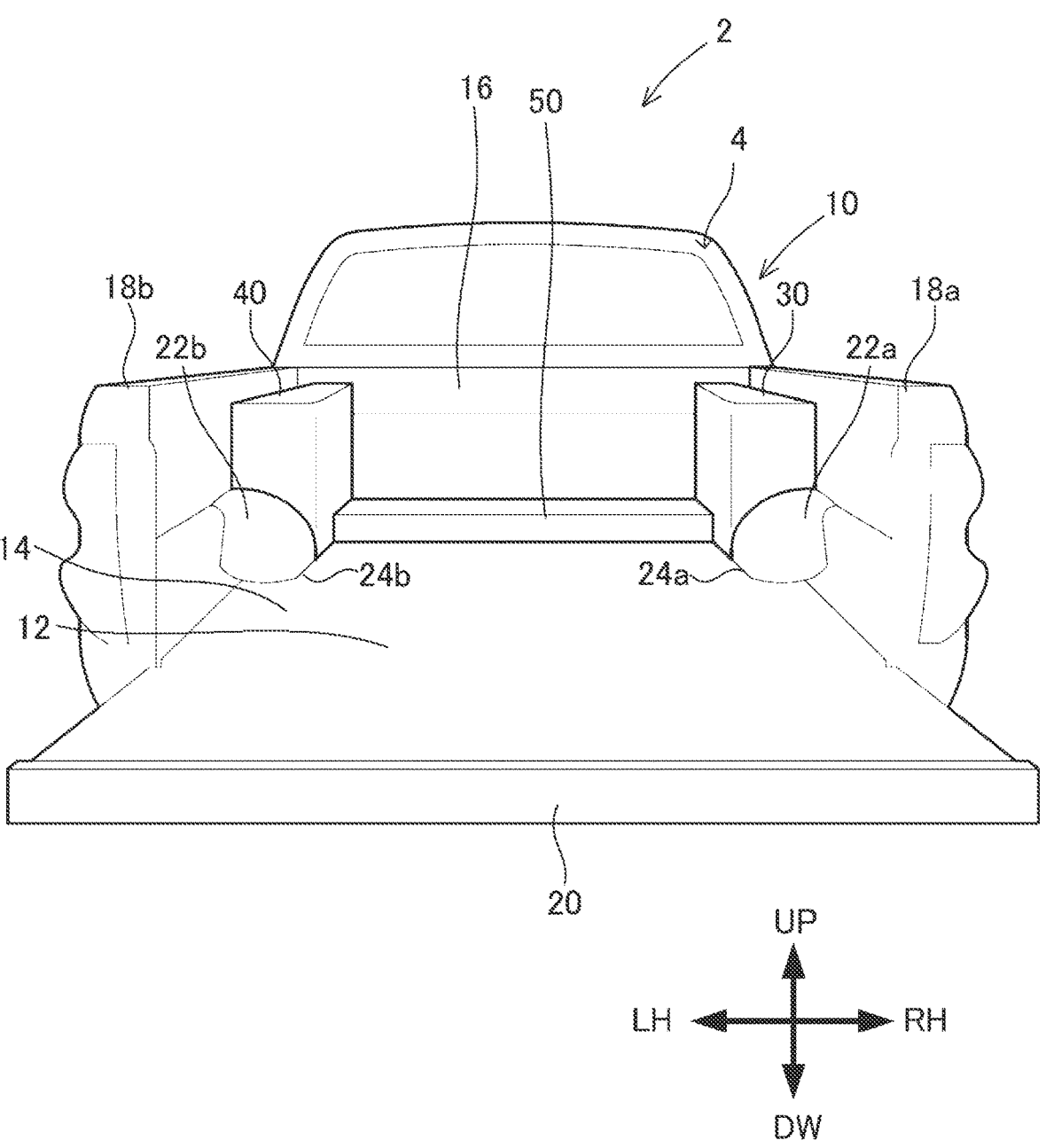
FIG. 1 is a rear view of a vehicle cargo bed of a vehicle according to an embodiment disclosed herein.

Embodiments disclosed herein relate to a vehicle comprising a cargo bed. A power converter is provided on a vehicle front side of one wheel well extending inward in the vehicle width direction from one side panel on an outer side in the vehicle width direction of the cargo bed, close to one side panel.

In an embodiment of the present disclosure, the power conversion unit may be provided in contact with at least a part of a front wall portion on a vehicle front side of one of the wheel wells. In this way, the front of the wheel well is more effective, and the shape of the floor surface of the cargo bed can be suppressed from being distorted.

In an embodiment of the present disclosure, the power converter may be provided on the vehicle width direction outer side of an inner edge extending inward in the vehicle width direction of one wheel well. By doing so, it is possible to mount the power converter by effectively utilizing the cargo bed while preventing the shape of the floor surface of the cargo bed from becoming stuck.

In an embodiment of the present disclosure, the power converter may be provided in contact with at least a portion of a front wall portion on a vehicle front side of one wheel well, at least a portion of one side panel, and a header panel disposed on a vehicle front side of the cargo bed. By doing so, it is possible to prevent the shape of the floor surface of the cargo bed from becoming stuck, and to mount the power converter by effectively utilizing the space between the front side of the vehicle of one of the wheel wells and the header panel of the cargo bed.

In an embodiment of the present disclosure, the power feed unit that houses the in-vehicle charger and the converter may be provided on the vehicle front side of the other wheel well that protrudes inward in the vehicle width direction from the other side panel on the outside in the vehicle width direction of the cargo bed and close to the other side panel. In this way, the in-vehicle charger and the step-up converter can be mounted on the cargo bed while suppressing a decrease in the loading amount and usability of the cargo bed by suppressing the shape of the floor surface of the cargo bed from becoming stuck.

In an embodiment of the present disclosure, a wiring for connecting the power converter and the battery mounted on the vehicle may be provided along at least a part of the header panel. In this way, it is possible to prevent the shape of the floor surface of the cargo bed from becoming prone, and to shorten the wiring length with respect to the battery mounted on the front of the cargo bed, for example.

Hereinafter, a vehicle disclosed in the present specification will be described with reference to the drawings as appropriate. Note that the vehicle illustrated in the drawings is only one embodiment of the vehicle disclosed in the present specification.

In the present specification, the descriptions such as the front, rear, and front-rear directions mean the front, rear, and front-rear directions of the vehicle, respectively. Similarly, the description of the left direction, the right direction, and the width direction means the left direction, the right direction, and the vehicle width direction in the vehicle, respectively, and the description of the upper direction, the lower direction, and the height direction in the vehicle means the upper direction, the lower direction, and the height direction in the vehicle.

Here, the direction FR in the drawing indicates the front in the vehicle front-rear direction, and the direction RR indicates the rear in the vehicle front-rear direction. The direction LH indicates the left in the vehicle width direction, and the direction RH indicates the right in the vehicle width direction. Further, the direction UP indicates an upward direction in the vehicle up-down direction, and the direction DW indicates a downward direction in the vehicle up-down direction.

In the present specification, vehicles belong to a so-called electrified vehicle, and may include a battery vehicle, a hybrid electric vehicle, fuel cell electric vehicle, and a solar car. The vehicle is typically an automobile. In addition, the cargo bed includes a cargo bed having a roof, which is also a part of a vehicle cabin, for example, in addition to a cargo bed having no roof. Vehicles with a cargo bed include, but are not limited to, pick-up trucks described below, common trucks with a cargo bed, trucks, SUV, and the like.

Figure 2:
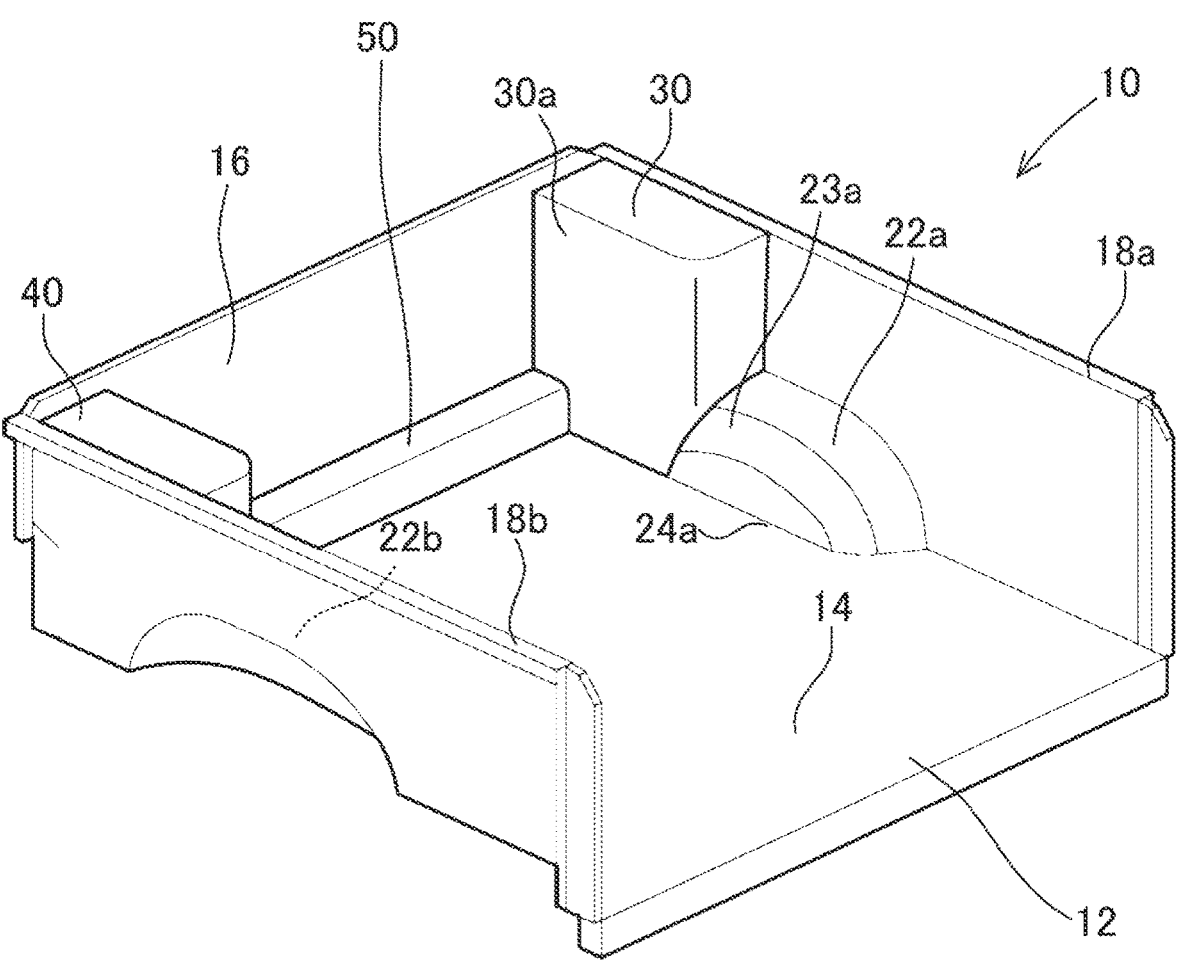
FIG. 2 is a view of the cargo bed shown in FIG. 1 as viewed from a rear obliquely behind the vehicle.
Figure 2:
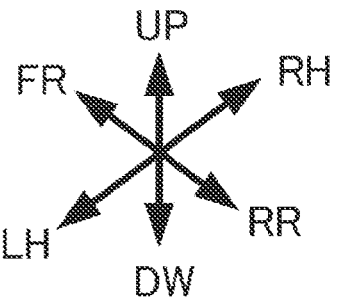
Figure 3:
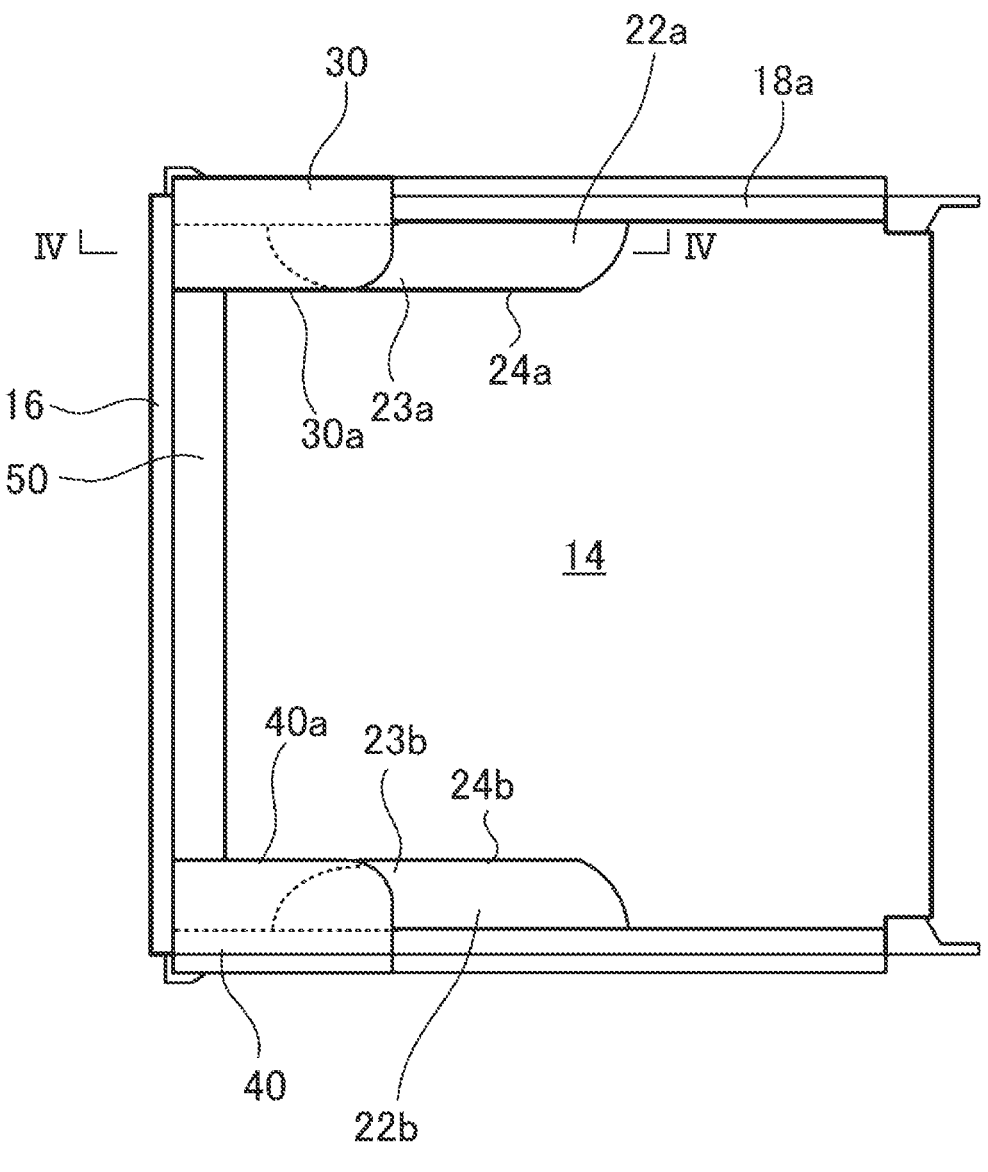
FIG. 3 is a plan view of the cargo bed shown in FIG. 1 as viewed from above the vehicle.
Figure 3:
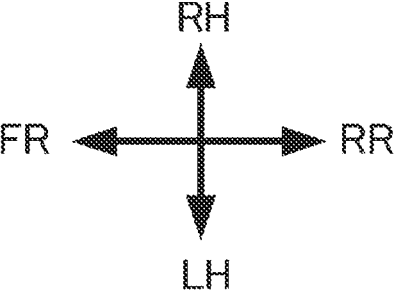
Figure 4:
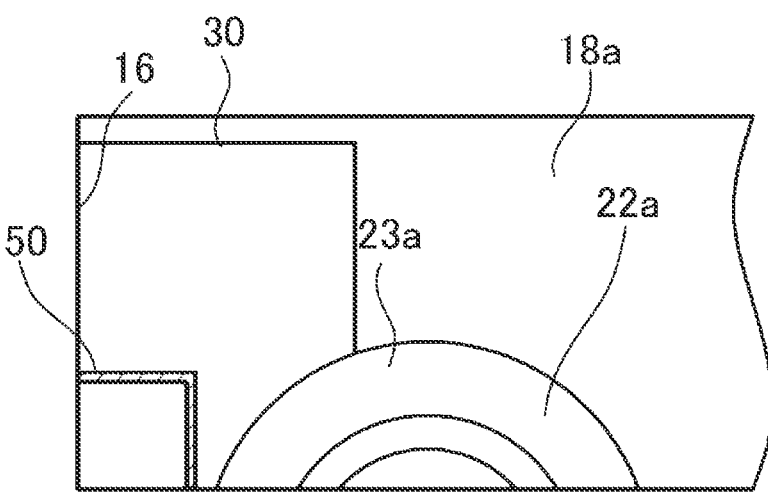
FIG. 4 is a cross-sectional view taken along IV-IV line of FIG. 3.
Figure 4:

FIG. 1 shows a rear view of a cargo bed 10 of a vehicle 2 which is a pickup truck, FIG. 2 shows a perspective view of the cargo bed 10 viewed obliquely from the rear, FIG. 3 shows a plan view of the cargo bed, and FIG. 4 shows a cross-sectional IV-IV view of FIG. 3.

As shown in FIG. 1, the vehicle 2 is provided with a vehicle cabin 4 at the front side and a cargo bed 10 at the rear side. The vehicle 2 is a so-called BEV, and includes a battery (not shown) extending below the vehicle cabin 4 in front of the cargo bed 10. The battery is not particularly limited, but is, for example, a rechargeable lithium-ion battery.

As illustrated in FIGS. 1 and 2, the cargo bed 10 includes a floor panel 12, a header panel 16, side panel 18a, 18b disposed on the left and right sides, and a gate 20.

The floor panel 12 is a panel constituting the floor surface 14. The header panel 16 is disposed in front of the vehicle so as to be integrated with or abut on the rear panel of the vehicle cabin 4, and defines the front end of the cargo bed 10. The side panel 18a, 18b is disposed horizontally in the widthwise direction and defines the left and right ends of the cargo bed 10. The gate 20 is disposed at a rear end of the cargo bed 10, is engaged with the floor panel 12, and is configured to be openable rearward with its lower edge as a base.

As shown in FIGS. 1 to 3, the side panel 18a, 18b is provided with a wheel well 22a, 22b. The wheel well 22a, 22b is a part of the rear fender of the vehicle 2 and accommodates an upper portion of the rear tire. The wheel well 22a, 22b bulges inward and upward in the cargo bed 10. The wheel well 22a, 22b illustrated in FIG. 1 and the like is formed in a curved shape as a whole, but the present disclosure is not limited thereto.

As shown in FIGS. 2 and 4, the front wall portion 23a, 23b of the wheel well 22a, 22b, which is a front portion, is spaced apart from the header panel 16. A part of the front wall portion 23a, 23b may reach the header panel 16. In addition, the wheel well 22a, 22b are arranged to face each other in the width direction, and the opposing surfaces thereof have an inner edge 24a, 24b that defines an inner side in the width direction. The inner edge 24a, 24b includes an innermost portion in which the wheel well 22a, 22b overhangs the innermost widthwise.

As illustrated in FIGS. 1 to 4, a power conversion unit 30 that houses a power converter is provided on a vehicle front side of a wheel well 22a. The power converter is a so-called inverter, and is an electric device that converts a direct current or an alternating current into a predetermined alternating current or direct current as necessary. The power conversion unit 30 may include a power conversion device in a housing and a connection device with a battery or the like.

In particular, as shown in FIGS. 2 and 3, the power conversion unit 30 is disposed in contact with the side panel 18a between the front wall portion 23a and the header panel 16, which constitute the front side of the wheel well 22a in the vehicle front-rear direction. The power conversion unit 30 is disposed in contact with the vehicle front part of the floor panel 12 and the front wall portion 23a and in contact with the header panel 16.

Furthermore, the power conversion unit 30 is disposed so as not to exceed the inner edge 24a on the inner side in the width direction of the wheel well 22a, that is, adjacent to the side panel 18a. More specifically, the power conversion unit 30 has an inner wall 30a that is parallel to the side panel 18a at the innermost portion of the inner edge 24a of the wheel well 22a. The height of the power conversion unit 30 does not exceed the height of the side panel 18a.

As shown in FIGS. 1 to 4, a power feed unit 40 is provided at the front of the wheel well 22b. The power feed unit 40 includes, for example, an in-vehicle charger, a charge control ECU, converters, and the like in a housing. The in-vehicle charger is, for example, an AC charger, and the converter is, for example, a DCDC converter. The power feed unit 40 may include a connection device with a battery or the like.

In particular, as shown in FIGS. 2 and 3, the power feed unit 40 is disposed in contact with the side panel 18b between the front wall portion 23b and the header panel 16, which constitute the front of the wheel well 22b in the front-rear direction of the vehicle. Further, the power feed unit 40 is disposed in contact with the vehicle front part of the floor panel 12 and the front wall portion 23b and in contact with the header panel 16.

Furthermore, the power feed unit 40 is disposed so as not to exceed the inner edge 24b on the inner side in the width direction of the wheel well 22b, i.e., close to the side panel 18b. More specifically, the power conversion unit 30 has an inner wall 40a that is parallel to the side panel 18b at the innermost portion of the inner edge 24b of the wheel well 22b. The height of the power feed unit 40 does not exceed the height of the side panel 18b.

As shown in FIGS. 1 to 4, an arrangement path 50 for accommodating a wiring is provided. The arrangement path 50 is disposed between the power conversion unit 30 and the power feed unit 40 along the lower edge of the header panel 16. The wiring is a wiring for connecting the power conversion unit 30 and the power feed unit 40. As shown in FIG. 4, the arrangement path 50 may be a cover connected to the header panel 16, the floor panel 12, the housing of the power conversion unit 30, the housing of the power feed unit 40, or the like, but may be a cylindrical body having a space for accommodating wiring. Note that a part of the cargo bed 10 is provided with a hole portion for connecting the wiring passing through the arrangement path 50 to the battery.

Next, an operation of the cargo bed 10 having such a mounting structure will be described. The cargo bed 10 includes the power conversion unit 30 and the power feed unit 40 on the cargo bed 10, but both are disposed in front of the wheel well 22a, 22b and close to the side panel 18a, 18b. That is, by effectively using the front side of the wheel well 22a, 22b close to the header panel 16, the cargo bed 10 can be used without greatly distorting the configuration of the floor surface 14 of the cargo bed 10. Therefore, the power conversion unit 30 and the power feed unit 40 can be mounted on the vehicle 2 without significantly lowering the loading amount of the cargo bed 10 and without lowering the usability of the cargo bed 10 of the user.

In addition, since both the power conversion unit 30 and the power feed unit 40 are arranged without exceeding the inner edge 24*a*, 24*b*, the loading capacity and usability of the cargo bed 10 are maintained.

Further, since the power conversion unit 30 and the power feed unit 40 are provided so as to be in contact with the front wall portion 23*a*, 23*b* of the wheel well 22*a*, 22*b*, even when the space between the wheel well 22*a*, 22*b* and the header panel 16 is narrow, the power conversion unit 30 and/or the power feed unit 40 can be arranged.

Further, since the arrangement path 50 for accommodating the wiring connecting the units 30 and 40 is arranged along the lower edge of the header panel 16, even if the wiring is provided on the cargo bed 10, it is avoided that the shape of the floor surface 14 of the cargo bed 10 is distorted, the loading amount of the cargo bed 10 is lowered, and the usability of the cargo bed 10 of the user is lowered.

Further, by mounting the power conversion unit 30 and/or the power feed unit 40 on the cargo bed 10 in this way, compared to mounting the units 30 and 40 under the floor, it is possible to inherently avoid corrosion due to impact and moisture adhesion from the ground, it is possible to omit the protective cover for avoiding these.

Further, by mounting the power conversion unit 30 and/or the power feed unit 40 on the cargo bed 10, it is possible to avoid the electric equipment such as a power converter from interfering with a strength member such as a shaft and being damaged in a lateral collision. Therefore, collision countermeasures for such interference can be omitted.

Further, by arranging the power conversion unit 30 and/or the power feed unit 40 on the cargo bed 10 and in front of the rear tire, it is possible to greatly reduce the load to be input to these units in the event of a rear collision. In addition, since there is no component that interferes in the left-right direction even at the time of side collision, it is possible to avoid the input of a load to the units 30 and 40 via the component.

Further, by mounting the power conversion unit 30 and/or the power feed unit 40 on the cargo bed 10 in this manner, it is advantageous in that the wiring between the power conversion unit 30 and/or the power feed unit 40 and the battery can be shortened when the battery is disposed on the front portion of the cargo bed 10 and/or on the front side of the cargo bed 10.

In the above-described embodiment, the pickup truck is exemplified as the vehicle 2 including the cargo bed 10, but the present disclosure is not limited thereto. For example, the vehicle may be a vehicle having a cargo bed (cargo compartment) continuously behind the vehicle cabin 4. In this case, the header panel 16 may not be provided on the front side of the cargo bed 10, or an element for replacing the header panel 16 may be separately provided.

Figure 5:
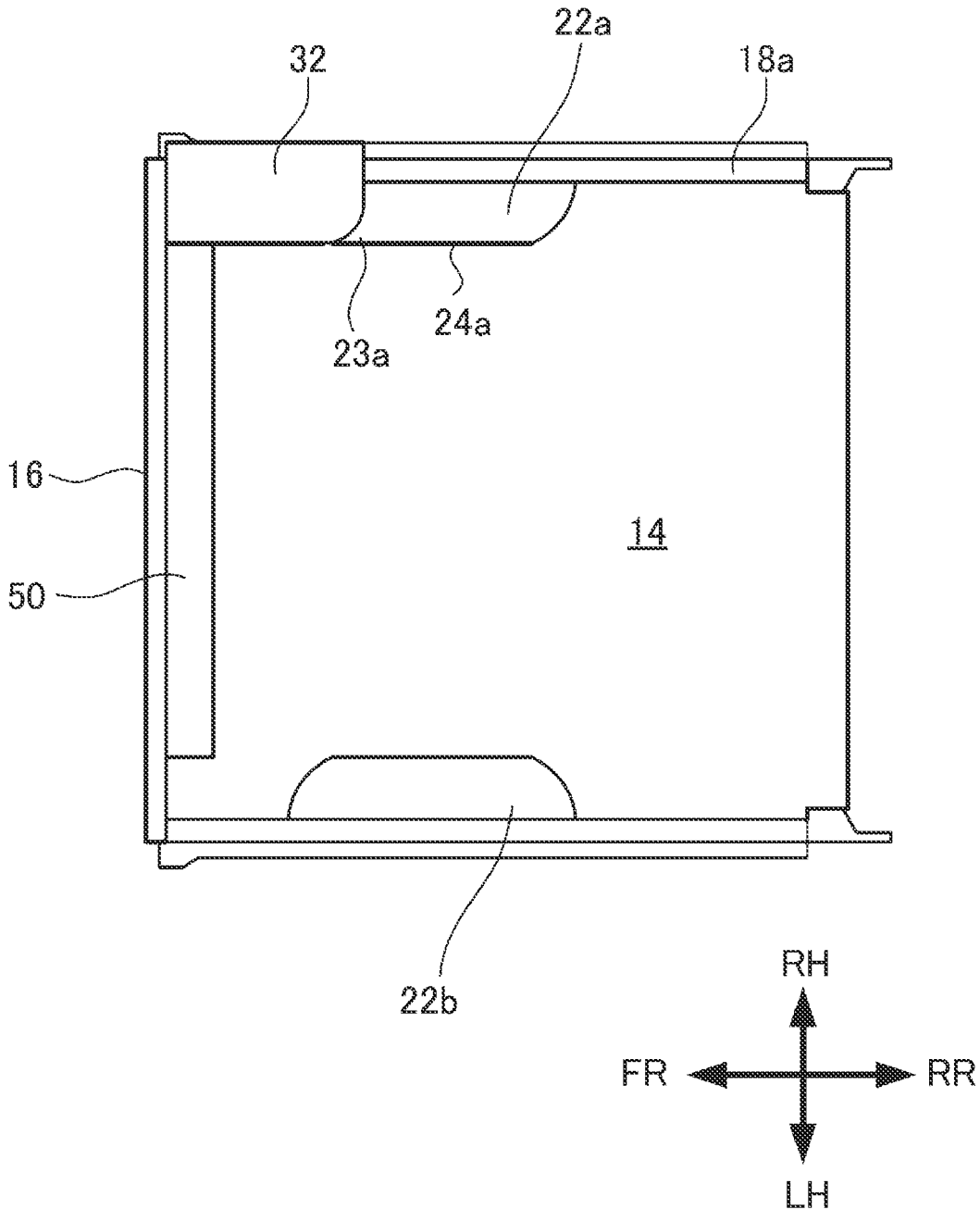
FIG. 5 is a diagram illustrating a cargo bed of a vehicle according to another embodiment of the vehicle.

In the above-described embodiment, the power conversion unit 30 and the power feed unit 40 are provided, but the present disclosure is not limited thereto. For example, as shown in FIG. 5, at least the power conversion unit 32 may be provided on the cargo bed 10 in the above-described configuration. In the above embodiment, the power feed unit 40 is provided separately from the power conversion unit 30, but the present disclosure is not limited thereto. For example, the power conversion unit 32 illustrated in FIG. 5 may include a charge control ECU, converters, and the like in the housing, in addition to the in-vehicle charger that is an element of the power feed unit 40.

In the above embodiment, the power conversion unit 30 and the power feed unit 40 are provided so as to be in contact with the front wall portion 23*a*, 23*b* of the wheel well 22*a*, 22*b*, but the present disclosure is not limited thereto, and the power conversion unit 30 and the power feed unit 40 may not be in contact with the front wall portion 23*a*, 23*b*.

In the above-described embodiment, the power conversion unit 30 and the power feed unit 40 are disposed on the widthwise outer side without exceeding the inner edge 24*a*, 24*b* of the wheel well 22*a*, 22*b*, but the present disclosure is not limited thereto. In some cases, the arrangement patterns of the power conversion unit 30 and the power feed unit 40 can be designed even when the inner edge 24*a*, 24*b* is exceeded, without causing the floor surface 14 of the cargo bed 10 to be distorted.

In the above-described embodiment, the power conversion unit 30 and the power feed unit 40 do not exceed the height of the side panel 18*a*, 18*b*, but may have a height equivalent to the wheel well 22*a*, 22*b*, for example.

In the above-described embodiment, the arrangement path 50 is provided in contact with the floor surface 14 over substantially the entire width of the header panel 16, but the present disclosure is not limited thereto. It is provided within a necessary range in relation to a battery or the like mounted on the vehicle 2.

The present specification may include the following configurations.

[1] A vehicle comprising a cargo bed in which a power conversion unit is provided on a vehicle front side of one wheel well extending inward in the vehicle width direction from one side panel on an outer side in the vehicle width direction of the cargo bed, close to at least one side panel.

[2] The vehicle according to [1], wherein the power conversion unit is provided in contact with at least a part of a front wall portion on a vehicle front side of the one wheel well.

[3] The vehicle according to [1] or [2], wherein the power conversion unit is provided on an outer side in the vehicle width direction than an inner edge extending inward in the vehicle width direction of the one wheel well.

[4] The vehicle according to any one of [1] to [3], wherein the power conversion unit is provided in contact with at least a part of a front wall portion on a vehicle front side of the one wheel well, at least a part of the one side panel, and a header panel disposed on a vehicle front side of the cargo bed.

[5] The vehicle according to any one of [1] to [4], wherein a power feed unit for accommodating the in-vehicle charger and the converter is provided on a vehicle front side of the other wheel well extending inward in the vehicle width direction from the other side panel on the outside in the vehicle width direction of the cargo bed, at least close to the other side panel.

[6] The vehicle according to any one of [1] to [5], further comprising a wiring connecting the power conversion unit and a battery mounted on the vehicle along at least a part of a header panel disposed on a vehicle front side of the cargo bed.

Although a number of specific examples have been described in detail above, these are merely examples and do not limit the scope of claims. The techniques described in the claims include various modifications and alterations of the specific examples illustrated above. The technical elements described in the present specification or drawings exhibit technical utility either on its own or in combination.

What is claimed is:

1. A vehicle comprising a cargo bed, wherein:

in the cargo bed, a power conversion unit is provided on a vehicle-forward side of one wheel well that extends inward in a vehicle-width direction from one side panel on an outer side in the vehicle-width direction of the cargo bed, in proximity to at least the one side panel; and the power conversion unit is provided in contact with at least part of a front wall portion of the one wheel well, on the vehicle-forward side of the one wheel well.

2. The vehicle according to claim 1, wherein the power conversion unit is provided on the outer side in the vehicle-width direction from an inner edge of the one wheel well that extends inward in the vehicle-width direction.

3. The vehicle according to claim 2, wherein the power conversion unit is provided in contact with at least part of the front wall portion, at least part of the one side panel, and a header panel disposed on the vehicle-forward side of the cargo bed.

4. The vehicle according to claim 3, wherein a power feed unit that accommodates an in-vehicle charger and a converter is provided on the vehicle-forward side of another wheel well that extends inward in the vehicle-width direction from another side panel on the outer side in the vehicle-width direction of the cargo bed, in proximity to at least the other side panel.

5. The vehicle according to claim 4, further comprising wiring that connects the power conversion unit and a battery installed in the vehicle, along at least part of the header panel.

* * * * *